US012777458B2

(12) United States Patent
Park

(10) Patent No.: US 12,777,458 B2
(45) Date of Patent: Oct. 27, 2026

(54) METHOD AND APPARATUS FOR CONTROLLING PAGING OPERATION

(71) Applicant: KT CORPORATION, Gyeonggi-do (KR)

(72) Inventor: Ki-hyeon Park, Seoul (KR)

(73) Assignee: KT CORPORATION, Gyeonngi-do (KR)

( * ) Notice: Subject to any disclaimer, the term of this patent is extended or adjusted under 35 U.S.C. 154(b) by 432 days.

(21) Appl. No.: 18/042,242

(22) PCT Filed: Aug. 19, 2021

(86) PCT No.: PCT/KR2021/011040
§ 371 (c)(1),
(2) Date: Feb. 20, 2023

(87) PCT Pub. No.: WO2022/039524
PCT Pub. Date: Feb. 24, 2022

(65) Prior Publication Data

US 2023/0337180 A1 Oct. 19, 2023

(30) Foreign Application Priority Data

Aug. 20, 2020 (KR) ........................ 10-2020-0104374
Aug. 17, 2021 (KR) ........................ 10-2021-0108070

(51) Int. Cl.
*H04W 68/02* (2009.01)
*H04W 68/00* (2009.01)

(52) U.S. Cl.
CPC ......... *H04W 68/02* (2013.01); *H04W 68/005* (2013.01)

(58) Field of Classification Search
CPC ............................ H04W 68/02; H04W 68/005
USPC .......................................................... 455/458
See application file for complete search history.

(56) References Cited

U.S. PATENT DOCUMENTS

| | | | | |
|---|---|---|---|---|
| 10,609,676 | B1 | 3/2020 | Agiwal et al. | |
| 2007/0254679 | A1 | 11/2007 | Montojo et al. | |
| 2008/0104397 | A1 | 5/2008 | Paddon et al. | |
| 2010/0255859 | A1 | 10/2010 | Park et al. | |
| 2011/0201361 | A1 | 8/2011 | Montojo et al. | |
| 2011/0244907 | A1* | 10/2011 | Golaup .................. | H04W 4/08 455/509 |
| 2012/0021714 | A1* | 1/2012 | Chen .................... | H04W 68/00 455/458 |

(Continued)

FOREIGN PATENT DOCUMENTS

| | | |
|---|---|---|
| CN | 101043718 A | 9/2007 |
| CN | 101312585 A | 11/2008 |

(Continued)

OTHER PUBLICATIONS

TS123 003 v15.9.0 (Jul. 2020) (Year: 2020).*

(Continued)

*Primary Examiner* — Mark G. Pannell
(74) *Attorney, Agent, or Firm* — IP Legal Services, LLC

(57) ABSTRACT

Provided are a method and apparatus for controlling a paging operation. The method may include receiving a paging message including identification information for each terminal for identifying a target to perform a paging operation and determining whether to apply the paging message on the basis of the identification information.

16 Claims, 13 Drawing Sheets

(56) References Cited

U.S. PATENT DOCUMENTS

| | | | | |
|---|---|---|---|---|
| 2012/0028656 | A1* | 2/2012 | Yi | H04W 76/10 455/458 |
| 2013/0121303 | A1 | 5/2013 | Cho et al. | |
| 2013/0122922 | A1 | 5/2013 | Cho et al. | |
| 2013/0136048 | A1 | 5/2013 | Cho et al. | |
| 2013/0331057 | A1* | 12/2013 | Kodali | H04W 76/19 455/450 |
| 2014/0004857 | A1* | 1/2014 | Rune | H04W 48/12 455/434 |
| 2015/0172895 | A1* | 6/2015 | Sengupta | H04W 8/06 455/404.2 |
| 2016/0028520 | A1 | 1/2016 | Nogami et al. | |
| 2016/0205659 | A1 | 7/2016 | Bergman et al. | |
| 2016/0249385 | A1 | 8/2016 | Gage | |
| 2017/0013519 | A1 | 1/2017 | Hahn et al. | |
| 2017/0078935 | A1 | 3/2017 | Hahn et al. | |
| 2017/0195987 | A1* | 7/2017 | Zarifi | H04W 68/02 |
| 2017/0237537 | A1 | 8/2017 | Nogami et al. | |
| 2017/0367069 | A1 | 12/2017 | Agiwal et al. | |
| 2018/0084405 | A1* | 3/2018 | Xi | H04W 48/08 |
| 2018/0115890 | A1* | 4/2018 | Lee | G08B 21/24 |
| 2018/0192401 | A1 | 7/2018 | Au et al. | |
| 2018/0227873 | A1* | 8/2018 | Vrzic | H04W 60/04 |
| 2018/0242371 | A1 | 8/2018 | Gage | |
| 2018/0324751 | A1* | 11/2018 | Hampel | H04W 68/02 |
| 2019/0037516 | A1* | 1/2019 | Kim | H04W 60/005 |
| 2019/0068348 | A1 | 2/2019 | Nam | |
| 2019/0159165 | A1 | 5/2019 | Agiwal et al. | |
| 2019/0268759 | A1* | 8/2019 | Targali | H04L 9/0825 |
| 2019/0306827 | A1* | 10/2019 | Agiwal | H04W 76/28 |
| 2020/0077359 | A1 | 3/2020 | Agiwal et al. | |
| 2020/0084747 | A1 | 3/2020 | Hong | |
| 2020/0163048 | A1 | 5/2020 | Kim et al. | |
| 2020/0236647 | A1 | 7/2020 | Agiwal et al. | |
| 2020/0260411 | A1 | 8/2020 | Hong | |
| 2020/0296670 | A1 | 9/2020 | Tang | |
| 2020/0367197 | A1 | 11/2020 | Agiwal et al. | |
| 2020/0383084 | A1 | 12/2020 | Kim et al. | |
| 2021/0045098 | A1* | 2/2021 | Bi | H04W 68/02 |
| 2021/0400489 | A1* | 12/2021 | Starsinic | H04W 60/04 |
| 2022/0030618 | A1* | 1/2022 | Wang | H04W 72/569 |
| 2022/0141802 | A1* | 5/2022 | Chen | H04W 68/02 455/458 |
| 2022/0394663 | A1 | 12/2022 | Liu | |
| 2023/0292326 | A1* | 9/2023 | Jung | H04L 5/0053 |
| 2023/0397090 | A1* | 12/2023 | Abedini | H04W 48/12 |

FOREIGN PATENT DOCUMENTS

| | | | |
|---|---|---|---|
| CN | 103081378 | A | 5/2013 |
| CN | 103179644 | A | 6/2013 |
| CN | 105075364 | A | 11/2015 |
| CN | 106063329 | A | 10/2016 |
| CN | 107409376 | A | 11/2017 |
| CN | 110011714 | A | 7/2019 |
| CN | 110475213 | A | 11/2019 |
| CN | 110881210 | A | 3/2020 |
| CN | 110945928 | A | 3/2020 |
| CN | 110999439 | A | 4/2020 |
| CN | 111066360 | A | 4/2020 |
| EP | 2453710 | A1 | 5/2012 |
| KR | 10-2009-0028447 | A | 3/2009 |
| KR | 10-2010-0130245 | A | 12/2010 |
| KR | 10-2019-0117680 | A | 10/2019 |
| WO | 2015/026285 | A2 | 2/2015 |

OTHER PUBLICATIONS

Lenovo et al., "Consideration on Idle/inactive-mode UE power saving", R2-2007468, 3GPP TSG-RAN WG2 Meeting RAN2#111 electronic, Online, Aug. 17-28, 2020.

European Patent Office, European Search Report of corresponding EP Patent Application No. 21858611.3, Jul. 25, 2024.

Ericsson, "Unambiguous derivation of group paging identifier for response-driven paging", R2-1803065, 3GPP TSG-RAN WG2 #101, Athens, Greece, Feb. 26-Mar. 2, 2018.

Ericsson, "Pseudo-CR on AMF Communication Service UE Context Data Model", C4-181032, 3GPP TSG CT4 Meeting #82, Gothenburg, SE; Jan. 22-Jan. 26, 2018.

Media Tek Inc., "Paging Enhancements for UE Power Saving in NR", R2-2007190, 3GPP TSG-RAN WG2 Meeting #111 electronic, Online, Aug. 17-28, 2020, pp. 1-8.

CMCC, "Discussion on Light Paging", R1-1713829, 3GPP TSG RAN WG1 Meeting #90, Prague, Czech Republic, Aug. 21-25, 2017.

* cited by examiner

METHOD AND APPARATUS FOR CONTROLLING PAGING OPERATION

CROSS REFERENCE TO RELATED APPLICATIONS

This application is a National Stage Patent Application of PCT International Patent Application No. PCT/KR2021/011040 (filed on Aug. 19, 2021) under 35 U.S.C. § 371, which claims priority to Korean Patent Application Nos. 10-2020-0104374 (filed on Aug. 20, 2020) and 10-2021-0108070 (filed on Aug. 17, 2021), the teachings of which are incorporated herein in their entireties by reference.

TECHNICAL FIELD

The present embodiments are related to a method and device for controlling a paging occasion in a next-generation wireless access network (hereinafter, "new radio (NR)").

BACKGROUND ART

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, subframe, Transmission Time Interval (TTI), etc.) as a method for efficiently satisfying each usage scenario requirement through a frequency band constituting any NR system.

As a part of this aspect, it is necessary to develop a design for reducing power consumption and performing an efficient paging operation in NR.

DETAILED DESCRIPTION OF THE INVENTION

Technical Problem

Embodiments of the disclosure may provide a method and device for controlling a paging operation for separately transmitting paging messages to be applied to different UEs sharing the same resource.

Technical Solution

In an aspect, the present embodiments may provide a method for performing a paging operation by a UE. The method may include receiving a paging message including per-UE identification information for identifying a target which is subject to the paging operation and determining whether to apply the paging message based on the identification information.

In another aspect, the present embodiments may provide a method for controlling a paging operation of a UE by a base station. The method may include configuring a paging message including per-UE identification information for identifying a target which is subject to the paging operation and transmitting the paging message.

In another aspect, the present embodiments may provide a UE performing a paging operation. The UE may include a receiver receiving a paging message including per-UE identification information for identifying a target which is subject to the paging operation and a controller determining whether to apply the paging message based on the identification information.

In another aspect, the present embodiments may provide a base station controlling a paging operation of a UE. The base station may include a controller configuring a paging message including per-UE identification information for identifying a target which is subject to the paging operation and a transmitter transmitting the paging message.

Advantageous Effects

According to the present embodiments, a paging operation may be controlled for separately transmitting paging messages to be applied to different UEs sharing the same resource.

Further, according to the present embodiments, it is possible to save power consumption by preventing erroneously receiving paging messages transferred to different UEs.

MODE FOR CARRYING OUT THE INVENTION

Figure 1:
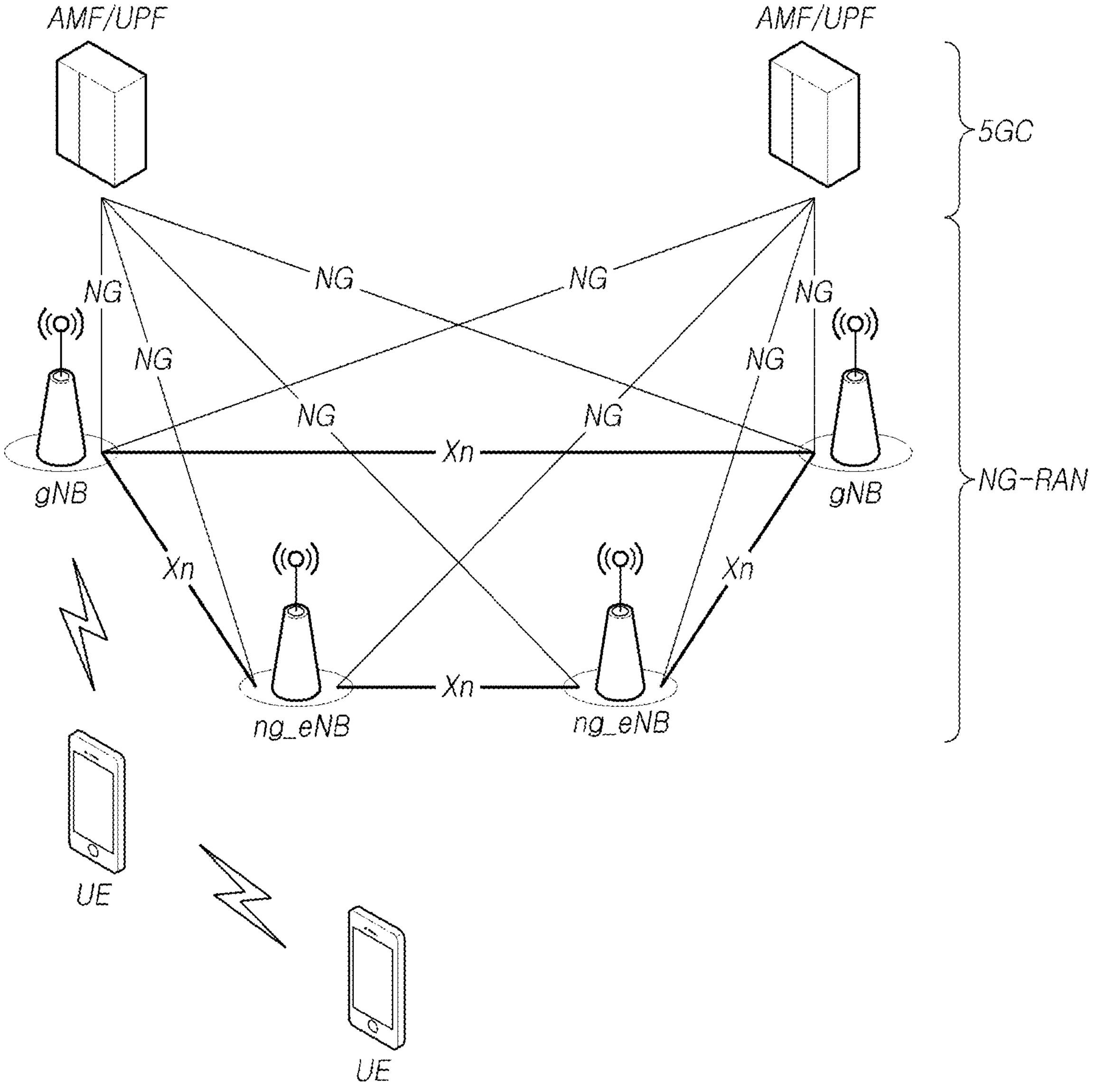
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or the UE may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1: FR1) and frequency bands equal to or greater than 6 GHz (frequency range 2: FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | normal | Yes | Yes |
| 1 | 30 | normal | Yes | Yes |
| 2 | 60 | Normal, Extended | Yes | No |
| 3 | 120 | normal | Yes | Yes |
| 4 | 240 | normal | No | Yes |

Figure 2:
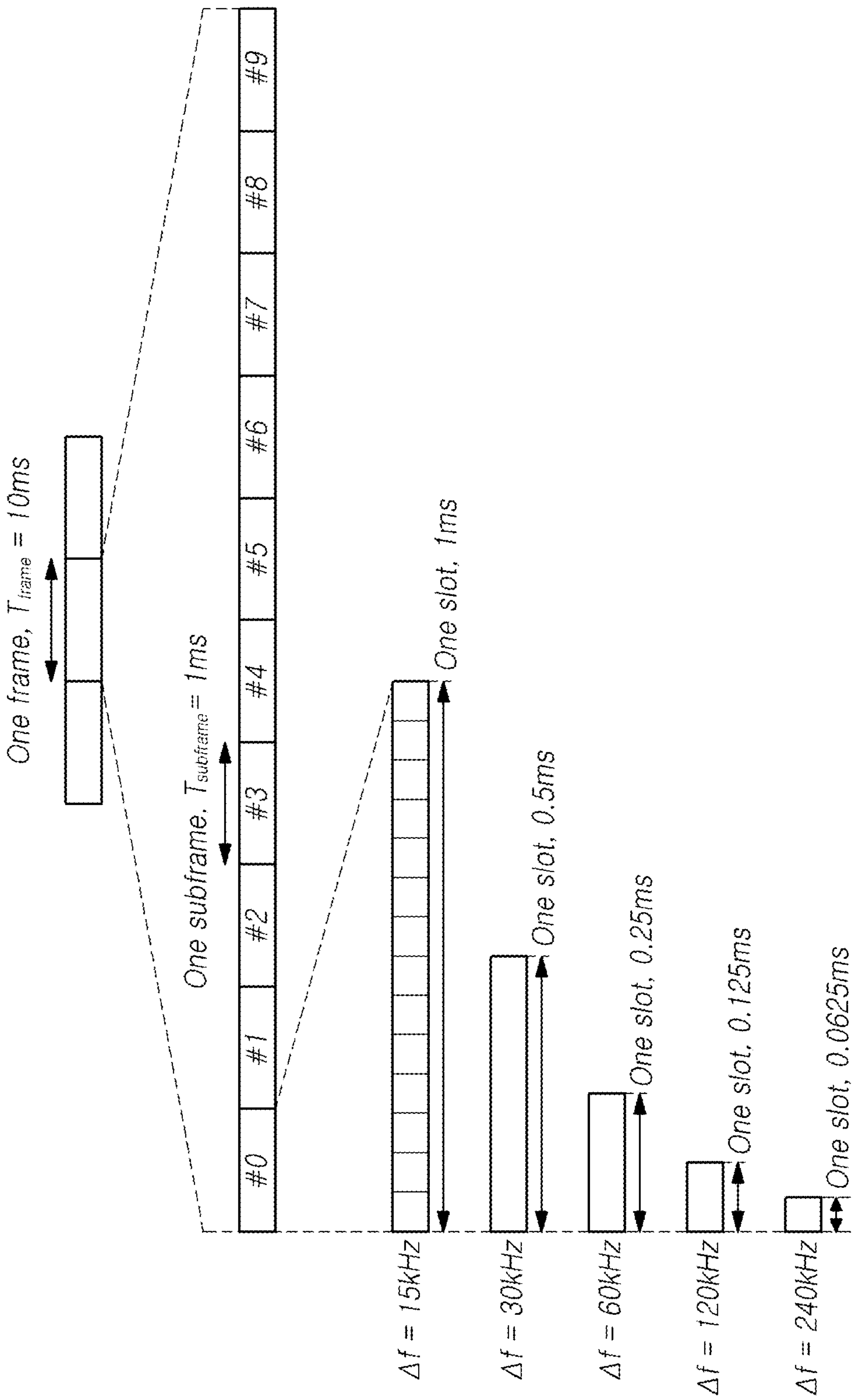
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR, a frame is defined to include 10 subframes each having the same length of 1 ms and has a length of 10 ms. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI).

The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
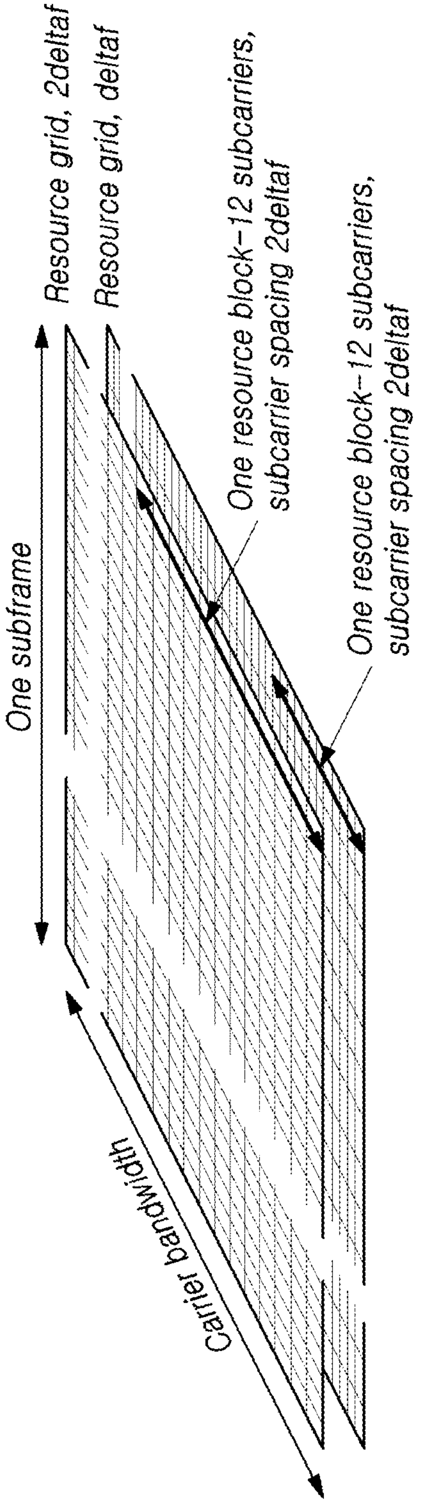
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
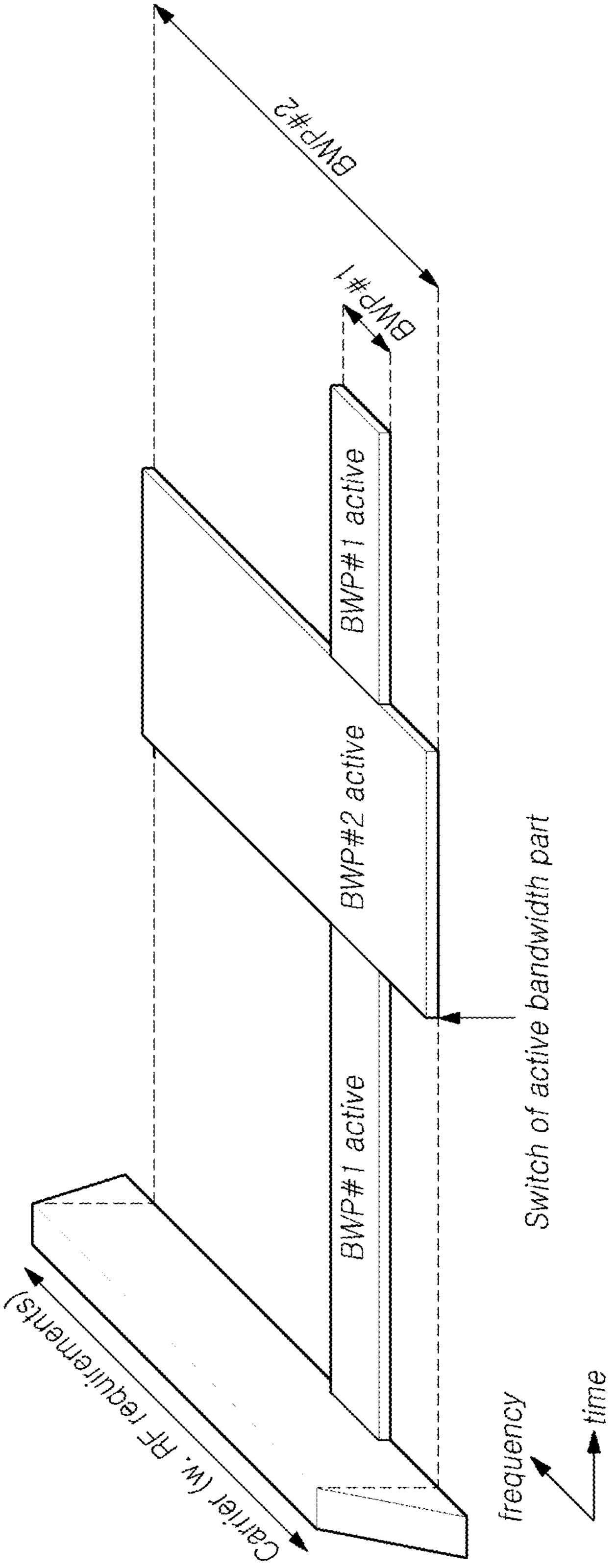
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
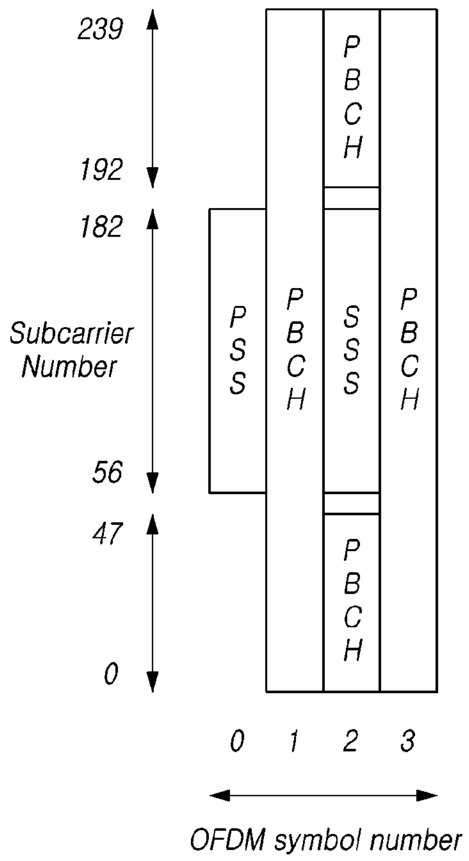
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
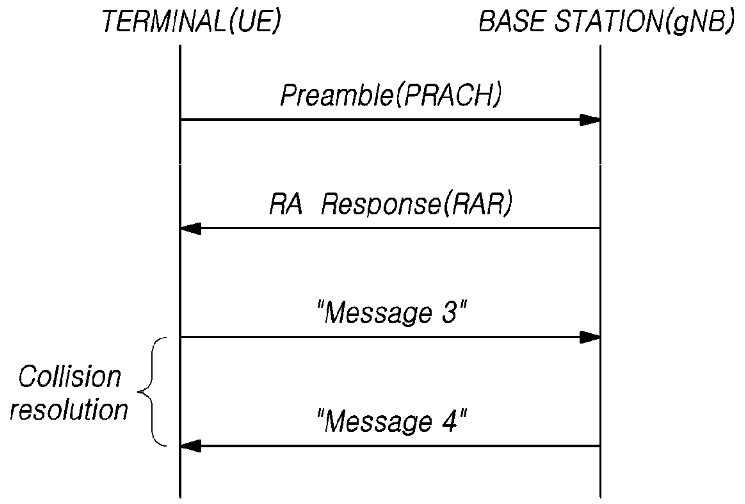
FIG. 6 is a signal diagram for explaining a random access procedure in a radio access technology in accordance with embodiments of the present disclosure.

FIG. 6 is a view for explaining a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
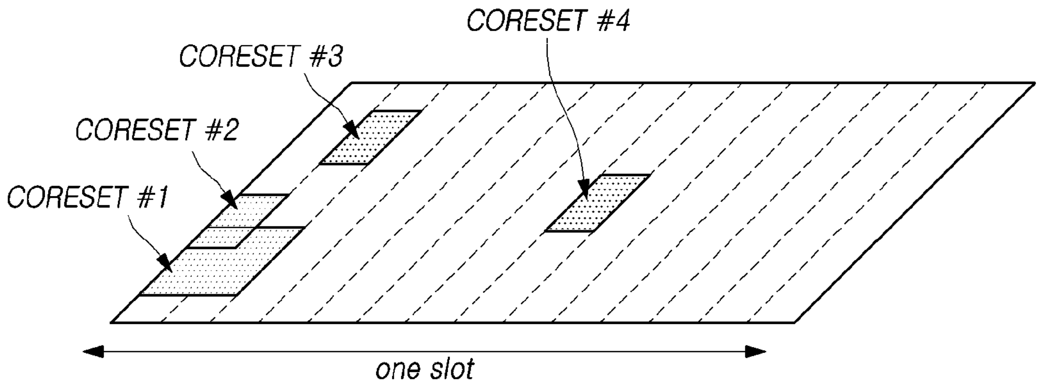
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms. Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 8:
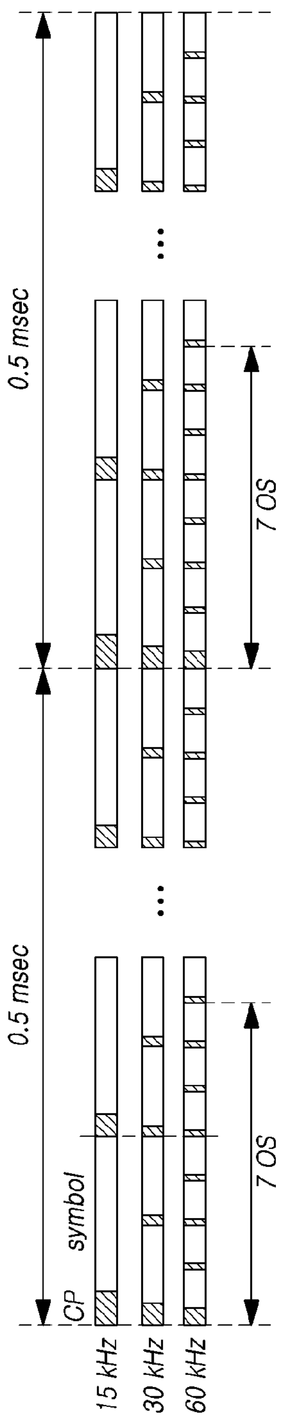
FIG. 8 is a view illustrating an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

Physical Resources

A physical resource for NR may be configured to be flexible compared to LTE. A Common Resource Block (CRB) is defined from a point A, which is a reference point of a frequency radio resource unit of a NR cell, and a BWP configuration for transmission and reception of a UE is made based on the CRB. In addition, when a plurality of SCSs are supported in a cell, a configuration for each subcarrier spacing-specific carrier bandwidth may also be made. In addition, PRB and VRB, which are units of radio resource allocation for a UE are configured for each BWP configured for the UE.

Wider Bandwidth Operations

The typical LTE system supports scalable bandwidth operations for an LTE CC (component carrier). That is, according to a frequency deployment scenario, an LTE provider may configure a bandwidth of a minimum of 1.4 MHz to a maximum of 20 MHz in configuring a single LTE CC, and a typical LTE UE supports a transmission/reception capability of a bandwidth of 20 MHz for a single LTE CC.

Figure 9:
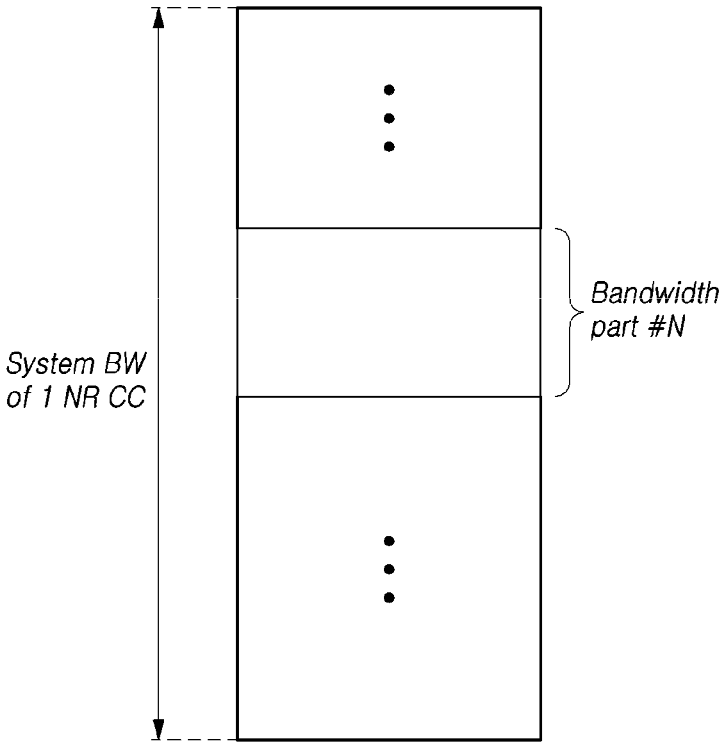
FIG. 9 is a view schematically illustrating a bandwidth part.

However, NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

NR Paging Procedure

Paging technology is used to attempt call reception to an RRC IDLE or RRC INACTIVE UE or to instruct an RRC IDLE, RRC INACTIVE or RRC CONNECTED UE to change system information or provide the UE with an ETWS/CMAS (Earthquake and Tsunami Warning System/Commercial Mobile Alert System) indication. For example, the RRC IDLE UE monitors a paging channel for core network-initiated (CN-initiated) paging, and the RRC INACTIVE UE monitors a paging channel for RAN-initiated paging.

Paging DRX is defined to reduce power consumption of the RRC IDLE or RRC INACTIVE UE. The paging DRX cycle may be configured by the network as follows.

A default cycle for core network-initiated paging is broadcasted through system information.

A UE-specific cycle for core network-initiated paging may be configured through NAS signaling.

A UE-specific cycle for RAN-initiated paging may be configured through RRC signaling.

The UE uses the shortest DRX cycle among applicable cycles. For example, the RRC IDLE UE uses the shortest of a default cycle for core network initiated paging and a UE-specific cycle. Similarly, the RRC INACTIVE UE uses the shortest of the above two cycles for core network initiated paging and one cycle for RAN initiated paging.

Meanwhile, the UE monitors one paging occasion (PO) per DRX cycle. The PO may include a plurality of timeslots in which the paging DCI is transmitted through a PDCCH monitoring attack set. A paging frame (PF) is one radio frame and may include one or more POs or start points of POs. In multi-beam operation, the length of one PO is one cycle of beam sweeping, and the UE assumes that the same paging message is repeated in all the beams of the sweeping pattern.

The UE monitors whether a paging message is transferred in the PO and determines based on whether a PDCCH scrambled with the P-RNTI is received in the PDCCH monitoring occasion set of the PO.

Meanwhile, the PF and PO are determined by the following formula.

The system frame number (SFN) for the PF is determined by the following equation.

$$(\text{SFN}+\text{PF\_offset}) \bmod T = (T \text{ div } N)*(\text{UE\_ID} \bmod N)$$

Further, an index (i_s) indicating a start point of a PDCCH monitoring occasion set for paging DCI is determined by the following equation.

$$i\_s = \text{floor}(\text{UE\_ID}/N) \bmod Ns$$

The PDCCH monitoring occasion for paging is determined according to the parameters if the 'paging-SearchSpace' and 'firstPDCCH-MonitoringOccasionOfPO' parameters are configured. If the corresponding parameter is not configured, the PDCCH monitoring occasion for paging is determined according to default association.

For default association, Ns is 1 or 2. When Ns=1, there is only one PO starting from the PF. When Ns is 2, the PO is present in the first frame (i_s=0) or the last frame (i_s=1) of the PF.

In the case of non-default association (e.g., when the paging-SearchSpace parameter is used), the UE monitors the $(i\_s+1)^{th}$ PO where the first PO starts in the PF. PDCCH monitoring occasions for paging that does not overlap UL symbols are numbered sequentially, with the first PDCCH monitoring occasion for paging in the PF set to 0.

When 'firstPDCCH-MonitoringOccasionOfPO' is present, the $(i\_s+1)^{th}$ PO is a set of 'S' contiguous PDCCH monitoring occasions for paging starting from the PDCCH monitoring occasion indicated by 'firstPDCCH-MonitoringOccasionOfPO'.

When 'firstPDCCH-MonitoringOccasionOfPO' is absent, the $(i\_s+1)^{th}$ PO is a set of 'S' contiguous PDCCH monitoring occasions starting from the $(i\_s*S)^{th}$ PDCCH monitoring occasion. Here, 'S' is the number of SSBs determined according to 'ssb-PositionsInBurst' of system information block 1 and actually transmitted. The Kth PDCCH monitoring occasion in the PO is associated with the Kth transmitted SSB.

Further, parameters for calculating PF and i_s are defined as follows.

T: DRX cycle of the UE. For example, T is determined as the shortest of the default DRX value broadcast in the system information and the UE-specific DRX value when configured by RRC or the higher layer. If UE-specific DRX is not configured by RRC or the higher layer, a default value is applied.

N: number of total paging frames in T

Ns: number of paging occasions for a PF

PF_offset: offset used for PF determination

UE_ID: 5G-S-TMSI mod 1024 value

The parameters N, Ns, PF_offset, first-PDCCH-MonitoringOccasionOfPO, and the length of the default DRX cycle are signaled by SIB 1.

For example, if the UE does not have 5G-S-TMSI, such as when the UE is not yet registered in the network, the UE should use the default ID, UE_ID=0, in the equation for determining PF and i_s.

5G-S-TMSI is a 48-bit long bit string. In the above equations for 5G-S-TMSI, the leftmost bit should be interpreted as a binary number representing the most significant bit.

In typical NR, a paging message is transmitted using DCI format 1-0. To that end, the base station previously indicates the area which is to be searched for the paging message by indicating the pagingSearchSpace in the PDCCH-ConfigCommon while previously performing the BWP resource configuration to the UE.

The paging message is scrambled with the P-RNTI defined as FFFE so that all the users may decode the corresponding control message. The RNTI constituted of 2 bytes is predefined in TS 38.321 as follows.

FFFF: SI-RNTI.

FFFE: P-RNTI.

FFF0~FFFD: Reserved.

0000: Not used.

Others: The RNTI (RA-RNTI, Temporary C-RNTI, C-RNTI, MCS-C-RNTI, CS-RNTI, TPC-PUCCH-RNTI, TPC-PUSCH-RNTI, TPC-SRS-RNTI, INT-RNTI, SFI-RNTI, and SP-CSI-RNTI)

paging message to which a value may be designated is defined in DCI format 1_0 as follows, and is scrambled with P_RNTI.

Short Messages Indicator—2 bits

Short Messages—8 bits. When carrying scheduling information only for paging, this bit field is reserved.

Frequency domain resource assignment—

$$\lceil \log_2(N_{RB}^{DLBWP}(N_{RB}^{DLBWP}+1)/2\rceil$$

bits. When carrying only short messages, this bit field is reserved.

$$N_{RB}^{DL,BWP}$$

is the size of CORESET 0.

Time domain resource assignment—4 bits. When carrying only short messages, this bit field is reserved.

VRB-to-PRB mapping—1 bit. When carrying short messages, this bit field is reserved.

Modulation and coding scheme—5 bits. When carrying short messages, this bit field is reserved.

TB scaling—2 bits. When carrying short messages, this bit field is reserved.

Reserved bits—8 bits, when operating in the cell having shared spectrum channel access; otherwise, 6 bits.

A typical paging message may include a short message transmission function capable of sending a disaster/urgent text message and a function capable of transitioning the UE into an active state. However, since all the UEs share the P-RNTI, it is impossible to differentiate the paging messages between the UEs. Thus, a UE may transition into the active state even when not intended, unless the pagingSearchSpace is physically given otherwise for the transmission position. In this case, power consumption of the UE is unnecessarily increased. To avoid this, a method is to previously configure a different paging search space in each UE. However, the area where control messages may be transmitted is limited in the limited radio resource, so that it may be hard to always provide different paging search spaces to many UEs.

In this regard, the following items are proposed for purposes in a UE power saving point of view.

1) Specify enhancements for idle/inactive-mode UE power saving, considering system performance aspects.

a) Study and specify paging enhancement(s) to reduce unnecessary UE paging receptions, subject to no impact to legacy UEs.

b) Specify means to provide potential TRS/CSI-RS occasion(s) available in connected mode to idle/inactive-mode UEs, minimizing system overhead impact.

Always-on TRS/CSI-RS transmission by gNodeB is not required.

2) Study and specify, if agreed, enhancements on power saving techniques for connected-mode UE, subject to minimized system performance impact.

a) Study and specify, if agreed, extension(s) to Rel-16 DCI-based power saving adaptation during DRX Active Time for an active BWP, including PDCCH monitoring reduction when C-DRX is configured.

Rel-15 and Rel-16 available power saving solutions should be supported by the UE and included in the evaluation.

b) Study the feasibility and performance impact of relaxing UE measurements for RLM and/or BFD, particularly for low mobility UE with short DRX periodicity/cycle, and specify, if agreed, relaxation in the corresponding requirements Hereinafter, a method for controlling a paging occasion will be described in detail with reference to relevant drawings.

Figure 10:
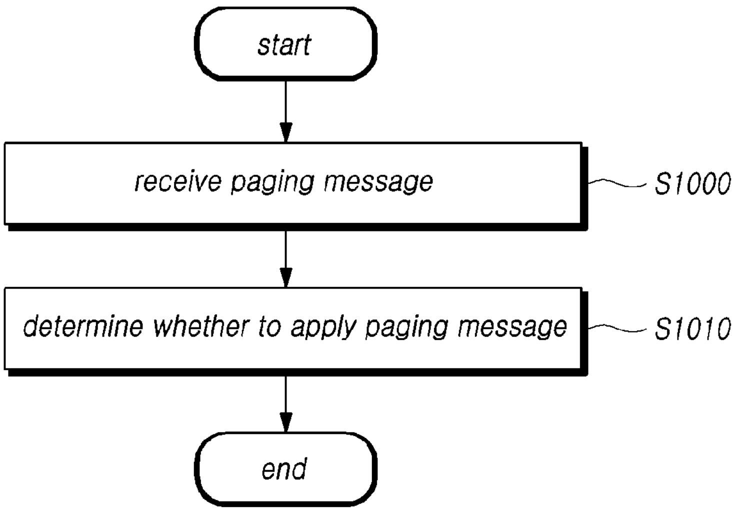
FIG. 10 is a flowchart illustrating a procedure of performing a paging occasion by a UE according to an embodiment.

FIG. 10 is a flowchart illustrating a procedure of performing a paging occasion by a UE according to an embodiment.

Referring to FIG. 10, the UE may receive a paging message including identification information per UE for identifying a target which is subject to a paging occasion from the base station (S1000).

The newly configured paging message may include identification information of the corresponding UE to allow a paging occasion to be performed only on the corresponding UE. In other words, such a new paging message may be configured to include the per-UE identification information for identifying a target UE for the paging occasion, and the new paging message may be configured separately from existing paging message. For example, the newly configured paging message may be transmitted to a UE power saving function-applied UE.

According to an embodiment, the identification information included in the paging message may include a downlink control channel-based permanent equipment identifier (PEI) configured for each UE. According to another embodiment, the identification information may be configured as a synchronization signal-based PEI (SSS-based PEI), such as SSS. According to still another embodiment, the identification information may be configured as a reference signal-based PEI (TRS/CSI-RS-based PEI), such as TRS or CSI-RS.

Further, the newly configured paging message may include a field (e.g., area or region) for transmitting new information for UE power saving along with UE ID information.

For example, such a field may include CSI-RS feedback transmission indication, idle-inactive state transition indication, and blind decoding (BD) skip time-related configuration that causes unintentional attempt to receive control information and search space reconfiguration.

The paging message may be received through a search space which is configured separately from a search space for receiving a paging message containing no per-UE identification information. In other words, the base station may use a search space separately configured as a space for sending a newly configured paging message. In this case, a UE power saving add operation-defined paging message may be configured to be transmitted only in such a separately configured search space. Or, the base station may send a control signal for performing a function different from the existing one in relation to paging control, through the search space separately configured in the UE.

According to an embodiment, the paging message may be received through monitoring for the paging message in the PDCCH monitoring occasion set included in one paging occasion (PO). For example, the UE may monitor whether a paging message is received in a DRX cycle. In other words, the UE may monitor whether there is a paging message for the corresponding UE in the PDCCH monitoring occasion set of the PO configured in the DRX cycle. For example, the UE may monitor whether there is a signal scrambled with the P-RNTI in the corresponding PDCCH monitoring occasion by performing blind decoding. Here, when a separate RNTI, not the P-RNTI, is applied to the newly configured paging message, the UE may monitor whether there is a signal scrambled with the RNTI.

According to an embodiment, the PDCCH monitoring occasion set may be configured by repeating S contiguous PDCCH monitoring occasions M times. Here, S means the number of synchronization signal block transmissions determined based on the system information block, and M may be set to a natural number equal to or larger than 1. In other words, the PDCCH monitoring occasion set may be configured with one or more PDCCH monitoring occasions. Further, the PDCCH monitoring occasion set may be configured by repeating S PDCCH monitoring occasions M times.

When the paging occasion is not configured as an extended PDCCH monitoring occasion, the paging occasion set may be configured only with S contiguous PDCCH monitoring occasions. In contrast, when an extended PDCCH monitoring occasion is configured, the paging occasion set may be configured of S*M PDCCH monitoring occasions by repeating S contiguous PDCCH monitoring occasions M times.

Meanwhile, M may be included in the extended PDCCH monitoring occasion indication information and be received from the base station. The extended PDCCH monitoring occasion indication information may include the above-described M value and be received through higher layer signaling. Or, the extended PDCCH monitoring occasion indication information may be broadcasted through system information.

If M is set to 1, or the extended PDCCH monitoring occasion indication information is not received, the UE may configure a PDCCH monitoring occasion set with S contiguous PDCCH monitoring occasions and perform monitoring.

According to an embodiment, UEs for identifying the target for paging occasion may be configured as a preset number of sub groups per paging occasion. When the per-UE identification information for identifying the target for paging occasion is downlink control channel-based PEI, the PEI may be set for the sub group of UEs in one paging occasion.

Referring back to FIG. 10, the UE may determine whether to apply the paging message based on the identification information (S1010).

The UE may compare its own identification information with the identification information in the paging message including the per-UE identification information for identifying the target for paging occasion. When it is determined that the paging message is transmitted to the UE, the UE may perform the paging occasion corresponding to the content of the paging message.

For example, the UE may perform CSI-RS feedback transmission, idle-inactive state transition, and blind decoding skip causing unintentional attempt to receive control information and search space reconfiguration, or such operations.

According to the embodiments described above, a paging operation may be controlled to separately transmit paging messages for differently applying the paging message to each of UEs sharing the same resource.

Hereinafter, operations of the base station, related to the above-described UE operations, will be described below with reference to the drawings.

Figure 11:
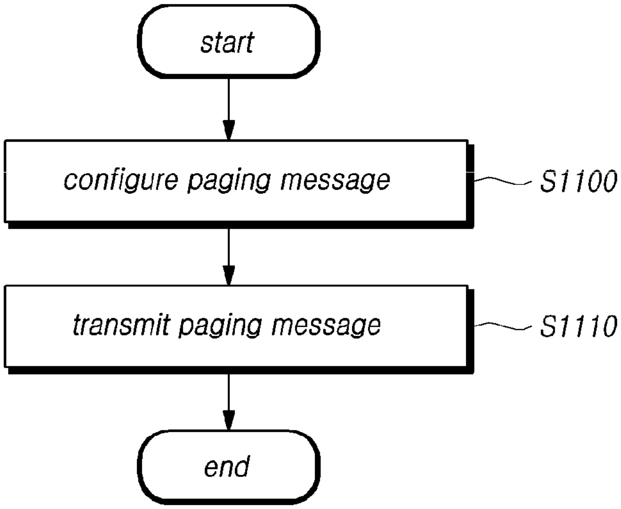
FIG. 11 is a flowchart illustrating a procedure of controlling a paging occasion of a UE by a base station according to an embodiment.

FIG. 11 is a flowchart illustrating a procedure of controlling a paging occasion of a UE by a base station according to an embodiment.

Referring to FIG. 11, the base station may configure a paging message including identification information per UE for identifying a target which is subject to a paging occasion (S1100).

The newly configured paging message may include identification information about a corresponding UE to allow a paging occasion to be performed only on the corresponding UE. In other words, the base station may configure the paging message including the per-UE identification information for identifying the target for the paging occasion, and such a paging message is separately configured from a typical paging message. For example, the newly configured paging message may be transmitted to a UE power saving function-applied UE.

According to an embodiment, the identification information included in the paging message may include a downlink control channel-based permanent equipment identifier (PEI) configured for each UE. According to another embodiment, the identification information may be configured as a synchronization signal-based PEI (SSS-based PEI), such as SSS. Or, the identification information may be configured as a reference signal-based PEI (TRS/CSI-RS-based PEI), such as TRS or CSI-RS.

Further, the newly configured paging message may include a field (e.g., region or area) for transferring new information for UE power saving along with UE ID information. Specifically, such a field may include CSI-RS feedback transmission indication, idle-inactive state transition indication, and blind decoding (BD) skip time-related configuration that causes unintentional attempt to receive control information and search space reconfiguration.

According to an embodiment, the base station may scramble the newly configured paging message with the P-RNTI. Or, the base station may apply a separate RNTI, not the P-RNTI, to the newly configured paging message and perform scrambling.

Referring back to FIG. 11, the base station may transmit the paging message to the UE (S1110).

The base station may transmit the newly configured paging message through a search space which is configured separately from a search space for receiving the paging message containing no per-UE identification information. In other words, the base station may use a search space separately configured as a space for sending a newly configured paging message. In this case, a UE power saving add operation-defined paging message may be configured to be transmitted only in the separately configured search space. Or, the base station may send a control signal for performing a function different from the existing one in relation to paging control, through the separate search space configured in the UE.

According to an embodiment, the paging message may be transmitted through the PDCCH monitoring occasion set included in one paging occasion (PO). In this case, the UE may monitor whether a paging message is received in a DRX cycle. In other words, the UE may monitor whether there is a paging message for the corresponding UE in the PDCCH monitoring occasion set of the PO configured in the DRX cycle.

According to an embodiment, UEs for identifying the target for paging occasion may be configured as a preset number of sub groups per paging occasion. When the per-UE identification information for identifying the target for paging occasion is downlink control channel-based PEI, the PEI may be set for the sub group of UEs in one paging occasion.

If the base station transmits the paging message, the UE may determine whether to apply the paging message based on the identification information. The UE may compare its own identification information with the identification information in the paging message including the per-UE identification information for identifying the target for paging occasion. When it is determined that the paging message is transmitted to the UE, the UE may perform the paging occasion corresponding to the content of the paging message.

For example, the UE may perform CSI-RS feedback transmission, idle-inactive state transition, and blind decoding skip causing unintentional attempt to receive control information and search space reconfiguration, or such operations.

According to the embodiments described above, a paging operation may be controlled to separately transmitting paging messages for differently applying the paging message to each of UEs sharing the same resource.

Hereinafter, each embodiment related to the method for controlling a paging occasion in NR will be described below in detail with reference to related drawings. The embodiments described below may be applied individually or in any combination thereof. The disclosure provides a method of separately transmitting paging messages to different users not to be applied to other users sharing the same resource. Specifically, there are provided a method for configuring a paging message that adds an identification message field to allow each user to identify whether the received paging message is the message transferred to the user, a method for transmitting a new RNTI-applied paging message which may be received only by a higher-version UE, and a method for configuring a new paging message search space.

Embodiment 1. Method for Configuring a Paging Message Adding an Identification Message Field This embodiment is a method for adding a new message field with a UE identification function to the paging message defined in downlink control information format 1_0 (DCI format 1_0). The UE may determine (e.g., identify) a paging message not transferred to the UE itself, through the message field. The method may be largely divided into a method using reserved bits and a method for configuring a control message in the format not to be decoded by a typical UE.

①Utilize Reserved Bits

This method is a method for transferring UE ID information using 6 to 8 reserved bits present in DCI 1_0 scrambled with a typical P-RNTI. This information may be previously transferred to each UE through RRC signaling. Or, the information may be obtained by being calculated by the UE itself based on a value predefined for each UE. In this case, the existing UE disregards the bits and operates. In contrast, the UE power saving function-applied UE may determine whether the control message is one transmitted to the UE based on the information in the field and operate.

②Configure a New Control Message

This method is a method for introducing a new control message replacing DCI 1_0 scrambled with a typical P-RNTI. In other words, this method is to disable a typical UE from properly receiving the corresponding information by introducing a new paging message dedicated for the UE power saving function-applied UE. The new control message may include an area where new information for UE power saving along with UE ID information may be transferred. Specifically, the new control message may include CSI-RS feedback transmission indication, idle-inactive state transition indication, and blind decoding (BD) skip time-related configuration that causes unintentional attempt to receive control information and search space reconfiguration.

Embodiment 2. Method for Applying New Paging RNTI

This embodiment is a method of scrambling a paging message using a new RNTI, rather than a typical P-RNTI, when determining the RNTI scrambling the paging message by the UE power saving function-applied UE for a typical UE and the UE power saving function-applied UE to differentiate paging messages therebetween. This method may be largely divided into a method of introducing a paging RNTI commonly used by UE power saving function-applied UEs and a method of previously configuring the RNTI to be used for paging by each of the UE power saving function-applied UEs.

①Using a New Common Paging RNTI

This method is a method of introducing a new P-RNTI to be commonly used only between UE power saving function-applied UEs. For example, the term may be defined as UPS-P-RNTI, and the value may be defined as, e.g., FFFD which is one reserved value. To that end, which RNTI is to be used as the paging RNTI may be preconfigured in the UE through RRC signaling. Further, the control message structure may be changed when different P-RNTIs are applied.

②Using a Different RNTI as the Paging RNTI for Each User

This method is a method of previously configuring a RNTI value to be used upon paging in the UE power saving function-applied UEs. The corresponding value may be set between 0001 and FFEF, set between FFF0 and FFFD, or set between 0001 and FFFD.

Embodiment 3. Method of Configuring a Paging Message Search Space

This embodiment is a method of introducing a procedure capable of differentiating between UEs when configuring a paging message search space through RRC. To that end, when the UE power saving function is adopted, the UE may be configured with two or more paging message search spaces unlike conventional. The control message sent through each search space may perform the same or different functions.

①Different Paging Message Search Spaces Perform the Same Function

This method is a method capable of reducing collision by increasing the number of patterns of the paging message search space of the UE by simultaneously transmitting the same control message in two search spaces. In this case, a method of dividing control messages by standardizing the control message insertion pattern may be considered. For example, there may be introduced a method for configuring spaces to have the same start position and size in search spaces having the same physical size and separately sending one control message in the spaces.

②Different Paging Message Search Spaces Perform Different Functions

This method is a method of transmitting a control message in which each paging message search space performs a different function. The base station may send a control signal performing a function different from the existing one in relation to paging control, through the additional control message search space configured in the UE. Or, the base station may also use it as a space for sending a new paging message as proposed in embodiment 1. In this case, the control message defining the UE power saving add operation may be rendered to be transmitted only in the new paging message reception space.

The above-described methods of the disclosure may be applied independently or in any type of combination. Further, among the terms used herein, novel terms are ones arbitrarily chosen for ease of understanding, and the content of the disclosure is applicable even where other terms with the same meaning are used.

According to the embodiment described above, a paging operation may be controlled to separately transmit paging messages for differently applying the paging message to each of UEs sharing the same resource. Accordingly, it is possible to save power consumption caused by erroneously receiving paging messages transferred to different UEs.

Hereinafter, hardware and software configurations of a UE and a base station which may perform all or some of the embodiments described above in connection with FIGS. 1 to 11 will be described with reference to the drawings. However, to avoid duplicate description, some of the above-described descriptions will be omitted.

Figure 12:
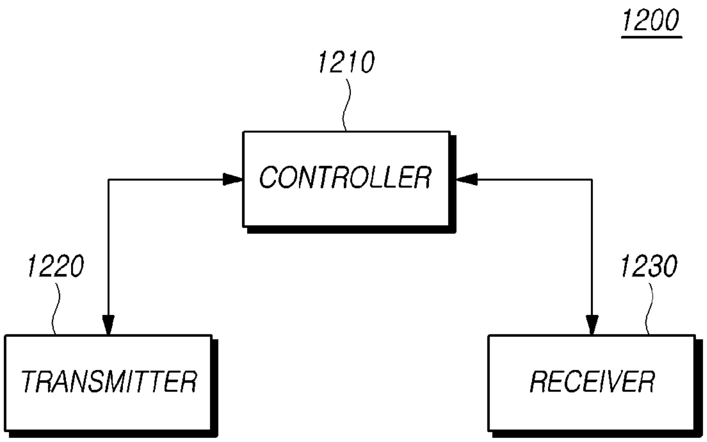
FIG. 12 is a block diagram illustrating a user equipment according to an embodiment.

FIG. 12 is a block diagram illustrating a UE 1200 according to an embodiment.

Referring to FIG. 12, according to an embodiment, a UE 1200 includes a controller 1210, a transmitter 1220, and a receiver 1230.

The controller 1210 controls the overall operation of the UE 1200 according to the method for controlling a paging occasion necessary to perform the above-described disclosure. The transmitter 1220 transmits uplink control information and data or messages to the base station via a corresponding channel. The receiver 1230 receives downlink control information and data or messages from the base station via a corresponding channel.

The receiver 1230 may receive a paging message including identification information per UE for identifying a target which is subject to a paging occasion from the base station. The newly configured paging message may include identification information about a corresponding UE to allow a paging occasion to be performed only on the corresponding UE. In other words, the paging message including the per-UE identification information for identifying the target for the paging occasion may be configured separately from a typical paging message. For example, the newly configured paging message may be transmitted to a UE power saving function-applied UE.

According to an embodiment, the identification information included in the paging message may include a downlink control channel-based permanent equipment identifier (PEI) configured for each UE. According to another embodiment, the identification information may be configured as a synchronization signal-based PEI (SSS-based PEI), such as SSS. Or, the identification information may be configured as a reference signal-based PEI (TRS/CSI-RS-based PEI), such as TRS or CSI-RS.

Further, the newly configured paging message may include a field for transmitting new information for UE power saving along with UE ID information. Specifically, such a field may include CSI-RS feedback transmission indication, idle-inactive state transition indication, and blind decoding (BD) skip time-related configuration that causes unintentional attempt to receive control information and search space reconfiguration.

The paging message may be received through a search space which is configured separately from a typical search space for receiving the paging message containing no per-UE identification information. In other words, the base station may use a search space separately configured as a space for sending a newly configured paging message. In this case, a UE power saving add operation-defined paging message may be configured to be transmitted only in the separately configured search space. Or, the base station may send a control signal for performing a function different from the existing one in relation to paging control, through the separate search space configured in the UE.

According to an embodiment, the receiver 1230 may receive a newly configured paging message through monitoring for the paging message in the PDCCH monitoring occasion set included in one paging occasion (PO). For example, the controller 1210 may monitor whether a paging message is received in a DRX cycle. In other words, the controller 1210 may monitor whether there is a paging message for the corresponding UE in the PDCCH monitoring occasion set of the PO configured in the DRX cycle. For example, the controller 1210 may monitor whether there is a signal scrambled with the P-RNTI in the corresponding PDCCH monitoring occasion by performing blind decoding. Here, when a separate RNTI, not the P-RNTI, is applied to the newly configured paging message, the controller 1210 may monitor whether there is a signal scrambled with the RNTI.

According to an embodiment, UEs for identifying the target for paging occasion may be configured as a preset number of sub groups per paging occasion. When the per-UE identification information for identifying the target for paging occasion is downlink control channel-based PEI, the PEI may be set for the sub group of UEs in one paging occasion.

The controller 1210 may determine whether to apply the paging message based on the identification information. The controller 1210 may compare its own identification information with the identification information in the paging message including the per-UE identification information for identifying the target for paging occasion. When it is determined that the paging message is transmitted to the UE itself, the controller 1210 may perform the paging occasion corresponding to the content of the paging message.

For example, the controller 1210 may perform CSI-RS feedback transmission, idle-inactive state transition, and blind decoding skip causing unintentional attempt to receive control information and search space reconfiguration, or such operations.

According to the embodiment described above, a paging operation may be controlled to separately transmit paging messages for differently applying the paging messages to each UEs sharing the same resource.

Figure 13:
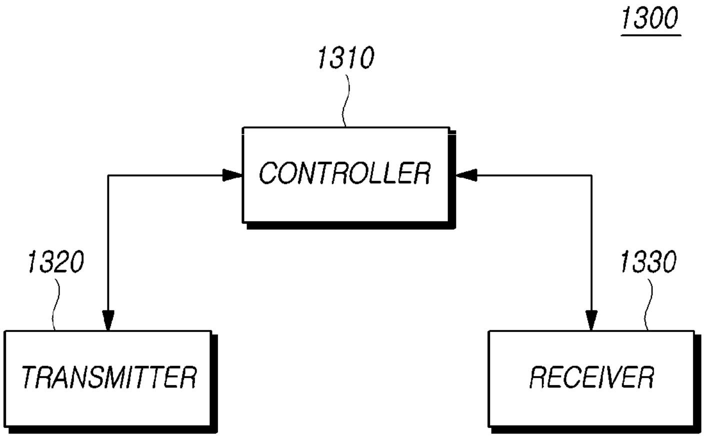
FIG. 13 is a block diagram illustrating a base station according to an embodiment.

FIG. 13 is a block diagram illustrating a base station 1300 according to an embodiment.

Referring to FIG. 13, according to an embodiment, a base station 1300 includes a controller 1310, a transmitter 1320, and a receiver 1330.

The controller 1310 controls the overall operation of the base station 1300 according to the method for controlling a paging occasion necessary to perform the above-described disclosure. The transmitter 1320 and the receiver 1330 are used to transmit or receive signals or messages or data necessary for performing the above-described disclosure, with the UE.

The controller 1310 may configure a paging message including identification information per UE for identifying a target which is subject to a paging occasion. The newly configured paging message may include identification information about the corresponding UE to allow a paging occasion to be performed only on a predetermined UE. In other words, the controller 1310 may configure the paging message including the per-UE identification information for identifying the target for the paging occasion separately from a typical paging message. For example, the newly configured paging message may be transmitted to a UE power saving function-applied UE.

According to an embodiment, the identification information included in the paging message may include a downlink control channel-based permanent equipment identifier (PEI) configured for each UE. Or according to another embodiment, the identification information may be configured as a synchronization signal-based PEI (SSS-based PEI), such as SSS. Or, the identification information may be configured as a reference signal-based PEI (TRS/CSI-RS-based PEI), such as TRS or CSI-RS.

Further, the newly configured paging message may include a field (e.g., area or region) for transferring new information for UE power saving along with UE ID information. Specifically, such a field may include CSI-RS feedback transmission indication, idle-inactive state transition indication, and blind decoding (BD) skip time-related configuration that causes unintentional attempt to receive control information and search space reconfiguration.

According to an embodiment, the controller 1310 may scramble the newly configured paging message with the P-RNTI. Or, the controller 1310 may apply a separate RNTI, not the P-RNTI, to the newly configured paging message and perform scrambling.

The transmitter 1320 may transmit a paging message to the UE. The transmitter 1320 may transmit the newly configured paging message through a search space configured separately from a search space for a paging message containing no per-UE identification information. In other words, the transmitter 1320 may use the separately configured search space as a space for sending a newly configured paging message. In this case, a UE power saving add operation-defined paging message may be configured to be transmitted only in the separately configured search space. Or, the transmitter 1320 may send a control signal for performing a function different from the existing one in relation to paging control, through the separate search space configured in the UE.

According to an embodiment, the paging message may be transmitted through the PDCCH monitoring occasion set included in one paging occasion (PO). In this case, the UE may monitor whether a paging message is received in a DRX cycle. In other words, the UE may monitor whether there is a paging message for the corresponding UE in the PDCCH monitoring occasion set of the PO configured in the DRX cycle.

According to an embodiment, UEs for identifying the target for paging occasion may be configured as a preset number of sub groups per paging occasion. When the per-UE identification information for identifying the target for paging occasion is downlink control channel-based PEI, the PEI may be set for the sub group of UEs in one paging occasion.

If the transmitter 1320 transmits the paging message, the UE may determine whether to apply the paging message based on the identification information. The UE may compare its own identification information with the identification information in the paging message including the per-UE identification information for identifying the target for paging occasion. When it is determined that the paging message is transmitted to the UE itself, the UE may perform the paging occasion corresponding to the content of the paging message.

For example, the UE may perform CSI-RS feedback transmission, idle-inactive state transition, and blind decoding skip causing unintentional attempt to receive control information and search space reconfiguration, or such operations.

According to the embodiments described above, a paging operation may be controlled to separately transmit paging messages for differently applying the paging messages to each of UEs sharing the same resource.

Hereinafter, a method for monitoring a paging message by a UE will be described. The UE performing a paging occasion may monitor whether a paging message is present in the PDCCH monitoring occasion set included in one paging occasion.

For example, the UE monitors whether a paging message is received in a DRX cycle. In other words, the UE monitors whether there is a paging message for the corresponding UE in the PDCCH monitoring occasion set of the PO configured in the DRX cycle. For example, the UE may monitor whether there is a signal scrambled with the P-RNTI in the corresponding PDCCH monitoring occasion by performing blind decoding.

Meanwhile, the PDCCH monitoring occasion set is configured by repeating S contiguous PDCCH monitoring occasions M times. Here, S means the number of synchronization signal block transmissions determined based on the system information block, and M may be set to a natural number equal to or larger than 1. In other words, the PDCCH monitoring occasion set is configured with one or more PDCCH monitoring occasions. Further, the PDCCH monitoring occasion set may be configured by repeating S PDCCH monitoring occasions M times.

When the paging occasion is not configured as an extended PDCCH monitoring occasion, the paging occasion set may be configured only with S contiguous PDCCH monitoring occasions. In contrast, when an extended PDCCH monitoring occasion is configured, the paging occasion set may be configured of S*M PDCCH monitoring occasions by repeating S contiguous PDCCH monitoring occasions M times.

Meanwhile, M may be included in the extended PDCCH monitoring occasion indication information and be received from the base station. The extended PDCCH monitoring occasion indication information may include the above-described M value and be received through higher layer signaling. Or, the extended PDCCH monitoring occasion indication information may be broadcasted through system information.

If M is set to 1, or the extended PDCCH monitoring occasion indication information is not received, the UE configures a PDCCH monitoring occasion set with S contiguous PDCCH monitoring occasions and performs monitoring.

The UE may determine whether the base station has accessed the channel including the frequency band where the paging message is transmitted, in the PDCCH monitoring occasion set. The UE may determine whether the base station has accessed the corresponding channel in the PDCCH monitoring occasion set. For example, the frequency band of the channel may be a licensed band or an unlicensed band. When the frequency band is an unlicensed band, the UE may determine whether the base station succeeds in occupancy as a result of performing, e.g., LBT and accesses the channel including the frequency band. When the frequency band is a licensed band, the UE may determine whether the base station transmits a signal in the frequency band and accesses.

Such operation may prevent the UE from unnecessary power consumption according to paging message monitoring by determining whether the base station transmits any signal in the frequency band where the paging message is transmitted in the PDCCH monitoring occasion set.

According to an embodiment, upon detecting a PDCCH scrambled with the radio network temporary identifier (RNTI) except for the paging-RNTI (P-RNTI) or the reference signal transmitted by the base station in the PDCCH monitoring occasion set, the UE may determine that the base station accesses the channel. For example, upon receiving the DMRS transmitted from the base station in the PDCCH monitoring occasion set, the UE determines that the base station accesses the channel of the frequency band where the paging message is transmitted. As another example, upon detecting the PDCCH transmitted by the base station in the PDCCH monitoring occasion set, the UE determines that the base station accesses the channel of the frequency band where the paging message is transmitted. Here, the PDCCH may include a signal scrambled with an RNTI other than the P-RNTI. As another example, upon receiving the paging message scrambled with the P-RNTI in the PDCCH monitoring occasion set, the UE may determine that the base station accesses the channel.

According to an embodiment, upon determining that the base station accesses the channel, the UE may stop monitoring whether a paging message is present in the PDCCH monitoring occasion set. For example, upon determining that the base station accesses the channel including the frequency band of the PDCCH monitoring occasion set, the UE may stop the paging message monitoring operation in the subsequent PDCCH monitoring occasion. Specifically, it is assumed that the PDCCH monitoring occasion set is constituted of a total of four PDCCH monitoring occasions from index 0 to index 3. In this case, the UE monitors whether a paging message scrambled with P-RNTI is received in the PDCCH monitoring occasions 0 to 3.

Upon determining that the base station accesses the channel in the PDCCH monitoring occasion 1, the UE stops the monitoring operation for detecting a paging message in the PDCCH monitoring occasions 2 and 3.

Such paging message stop operation may be applied only in the discontinuous reception (DRX) cycles including the paging occasions where the base station is determined to access the channel. For example, if one PO is present in one paging DRX cycle, and access to the channel by the base station in the PDCCH monitoring occasion set is detected, the UE stops only the paging message monitoring operation in the remaining PDCCH monitoring occasions configured in the PO of the corresponding paging DRX cycle. The paging message monitoring operation is resumed in the PO in the subsequent paging DRX cycle. In other words, the paging message monitoring stop operation according to the disclosure applies only in the DRX cycle and does not affect the next DRX cycle.

If the base station succeeds in accessing the corresponding frequency band but does not transmit a paging message to the UE, it may be regarded as there being no paging message in the DRX cycle. Therefore, it is possible to stop blind decoding unnecessary in the PDCCH monitoring occasion set in the corresponding PO to prevent power consumption.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method for performing a paging operation by a user equipment (UE), the method comprising:

receiving a paging message including per-UE identification information; and determining whether to apply the paging message based on the identification information, wherein the identification information includes a downlink control channel (PDCCH)-based permanent equipment identifier (PEI) configured for each UE, wherein the paging message includes the per-UE identification information configured to uniquely identify a target UE, and wherein the UE compares the PEI included in the paging message with identification information of the UE to determine whether the paging message corresponds to the UE.

2. The method of claim 1, wherein the paging message is received through a search space configured separately from a search space where a paging message lacking the identification information is received.

3. The method of claim 1, wherein the paging message is received through monitoring a paging message in a PDCCH monitoring occasion set included in one paging occasion.

4. The method of claim 3, wherein the downlink control channel-based PEI is equally configured for UEs in the one paging occasion.

5. A method for controlling a paging operation of a user equipment (UE) by a base station, the method comprising:

configuring a paging message including per-UE identification information; and transmitting the paging message, wherein the identification information includes a downlink control channel (PDCCH)-based permanent equipment identifier (PEI) configured for each UE, wherein the paging message includes the per-UE identification information configured to uniquely identify a target UE, and wherein the UE compares the PEI included in the paging message with identification information of the UE to determine whether the paging message corresponds to the UE.

6. The method of claim 5, wherein the paging message is transmitted through a search space configured separately from a search space where a paging message lacking the identification information is received.

7. The method of claim 5, wherein the paging message is transmitted through a PDCCH monitoring occasion set included in one paging occasion.

8. The method of claim 7, wherein the downlink control channel-based PEI is configured for a sub group of UEs in the one paging occasion.

9. A user equipment (UE) performing a paging operation, comprising:

a receiver configured to receive a paging message including per-UE identification information; and a controller configured to determine whether to apply the paging message based on the identification information, wherein the identification information includes a downlink control channel (PDCCH)-based permanent equipment identifier (PEI) configured for each UE, wherein the paging message includes the per-UE identification information configured to uniquely identify a target UE, and wherein the UE compares the PEI included the paging message with identification information of the UE to determine whether the paging message corresponds to the UE.

10. The UE of claim 9, wherein the paging message is received through a search space configured separately from a search space where a paging message lacking the identification information is received.

11. The UE of claim 9, wherein the paging message is received through monitoring a paging message in a PDCCH monitoring occasion set included in one paging occasion.

12. The UE of claim 11, wherein the downlink control channel-based PEI is configured for a sub group of UEs in the one paging occasion.

13. A base station controlling a paging operation, comprising:

a controller configured to configure a paging message including per-UE identification information; and a transmitter configured to transmit the paging message, wherein the identification information includes a downlink control channel (PDCCH)-based permanent equipment identifier (PEI) configured to each UE, wherein the paging message includes the per-UE identification information configured to uniquely identify a target UE, and wherein the UE compares the PEI included in the paging message with identification information of the UE to determine whether the paging message corresponds to the UE.

14. The base station of claim 13, wherein the paging message is transmitted through a search space configured separately from a search space where a paging message lacking the identification information is received.

15. The base station of claim 13, wherein the paging message is transmitted through a PDCCH monitoring occasion set included in one paging occasion.

16. The base station of claim 15, wherein the downlink control channel-based PEI is configured for a sub group of UEs in the one paging occasion.

* * * * *